April 10, 1962     O. L. MARTIN     3,029,042
LAND, WATER AND AIR VEHICLE

Filed Jan. 23, 1958     3 Sheets-Sheet 1

Ogden L. Martin
INVENTOR.

BY Clarence A. O'Brien
and Harvey B. Jacobson
Attorneys

April 10, 1962 — O. L. MARTIN — 3,029,042
LAND, WATER AND AIR VEHICLE
Filed Jan. 23, 1958

Ogden L. Martin
INVENTOR.

April 10, 1962   O. L. MARTIN   3,029,042
LAND, WATER AND AIR VEHICLE
Filed Jan. 23, 1958   3 Sheets-Sheet 3

Ogden L. Martin
INVENTOR.

BY *Clarence A. O'Brien*
and *Harvey B. Jacobson*
Attorneys

United States Patent Office 3,029,042
Patented Apr. 10, 1962

3,029,042
LAND, WATER AND AIR VEHICLE
Ogden L. Martin, 1704 N. C St., Fremont, Nebr.
Filed Jan. 23, 1958, Ser. No. 710,676
14 Claims. (Cl. 244—2)

This invention relates to a vehicle which is capable of operating on land, water and in the air as a heavier-than-air craft.

An object of the invention is to provide a craft capable of travel on water, land, in the air or combinations of any of these. The invention is embodied in a vehicle that has a body whose section is in the form of lift producing airfoil. As such, the body has a rounded leading edge, a rather sharp trailing edge, an upwardly extending and smoothly cambered upper surface and a comparatively straight lower surface. With the lower surface made essentially flat, the invention takes advantage of ground effect in land take-off and landings or landings on water and in being propelled over the water. The shape of the body is used for the production of lift.

The phenomenally high lift of an airfoil that has an upwardly opening channel through which an airstream is passed, is known in the art at the present time. An object of this invention is to derive the benefits of a channel wing by having the upper surface of the vehicle body serve as the bottom of a channel and by having the sides of the channel constructed of control surface members that are adjustable independently of each other or in unison. Not only are the control surface members used as such, that is, to obtain aerodynamic directional control for the craft, but they also function as walls for the channel.

The motor for the craft is carried by the body and is arranged to produce an airstream over the body and especially in the channel that is formed by the control surface members and the upper surface of the body. This airstream, in the jet engine version of the invention, can be varied and regulated to function as a high lift device. One of the engine air inlets has a control shutter on it and is so arranged that the boundary layer air is removed from the body upper surface at a point behind (downstream) of the maximum thickness station of the airfoil shaped body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
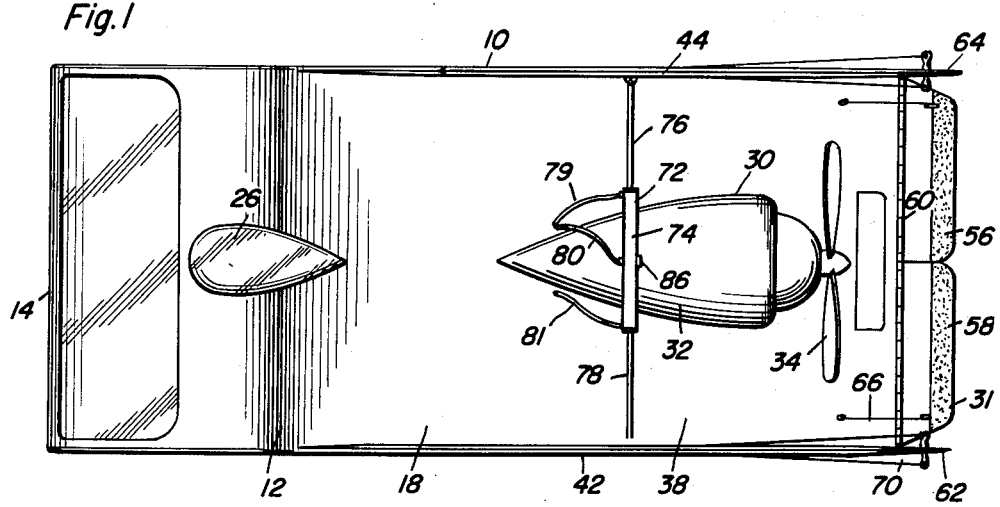
FIGURE 1 is a top view of a vehicle constructed in accordance with the invention.
Figure 2:
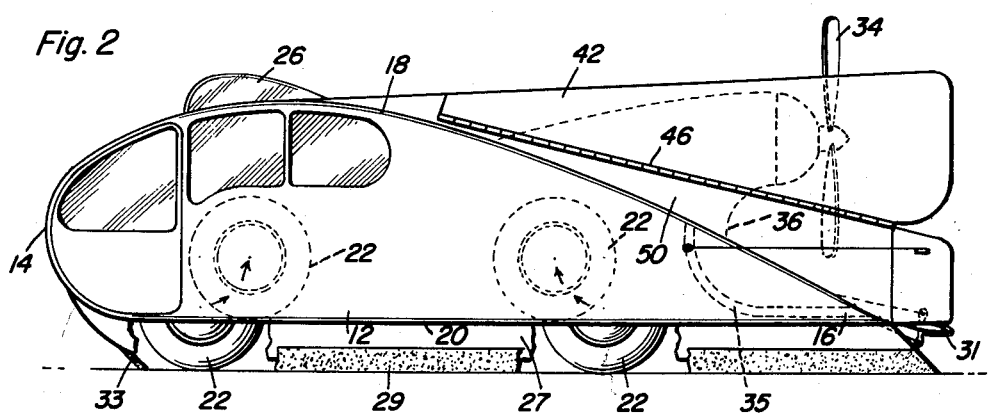
FIGURE 2 is a side view of FIGURE 1.
Figure 3:
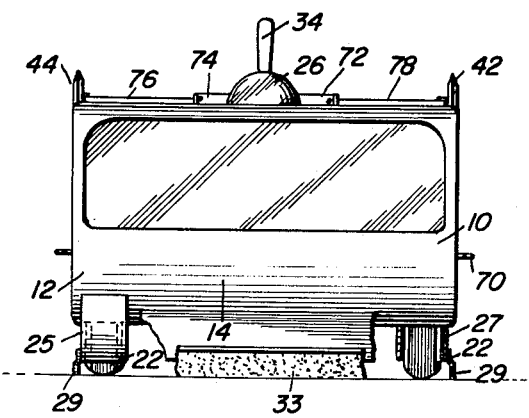
FIGURE 3 is a front view of the vehicle in FIGURE 1.
Figure 4:
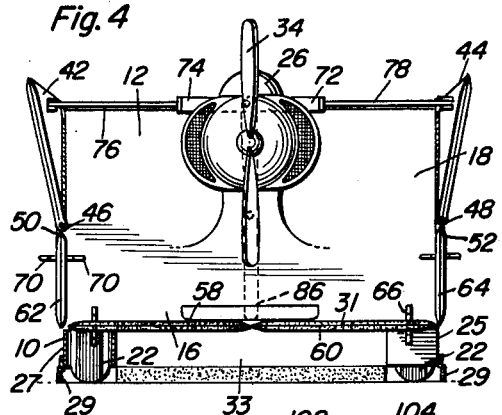
FIGURE 4 is a rear view of the vehicle in FIGURE 1.

In the accompanying drawings, there is a craft or vehicle 10 having a body 12 within which one or more passengers are adapted to be transported. The body has a section similar to an airfoil (FIGURE 2) and is capable of producing aerodynamic lift. Body 12 has a rounded leading edge 14, a rather sharp trailing edge 16, a smoothly curved upper surface 18 and a comparatively flat lower surface 20. The shape is selected from one of the NACA airfoils. The bottom surface 20 is formed by a thin skin over an air frame with the skin being airtight and having wheel wells within which the four wheels 22 are accommodated. Each wheel can be fixed or supported by an oleo strut or supported by some other standard structure for retracting the wheels when the vehicle 10 is in flight or travelling over the water surface. The wheels extend through the bottoms of two ski-like wheel housings 25 and 27 with flexible strips 29 along their lower outer edges. Also, there is a strip 31 of the same material, as belting, on the rear edge of the elevator. Flap 33 having a flexible strip at its lower edge, is hinged to the front lower part of the body and extends transversely thereacross. The controls for flap 33 are connected with those of the rear elevator so that the strap along its edge may contact the runway when down.

Standard instrumentation, windows and other equipment required for licensing is contemplated. An observation bubble 26 of transparent material rises from the top of the airfoil shaped body at approximately the maximum thickness station thereof. This is to achieve a full 360° plane of vision that is especially important in sea and land travel.

An engine 30 is mounted in an engine nacelle 32. The exhaust gas is piped by conduit 35 through the bottom of the craft. Also, a part of the propulsive blast can be piped under the body to add to the air cushion on landing and to the lift on take-off. This is especially important for water take-offs. Engine 30 has propeller 34 for producing the airstream. The airstream provides thrust and lift for the body. The lift is not so important in land and water travel, but, of course, is essential for air travel. An engine support 36 mounts the nacelle above the upper surface 18 and considerably downstream of the centers of lift, pressure and gravity of the craft. Propeller 34 is located in an upwardly opening channel 38 whose boundaries are formed by the surface 18 and two control surface members 42 and 44. These members 42 and 44 provide aerodynamic control forces for the craft and serve as fins and means for lateral control and stability. They may be considered roll control surfaces. The members 42 and 44 are comparatively flat and elongated and are located near the sides of the body 12. They are mounted by hinges 46 and 48 on stationary fins 50 and 52 extending fore and aft of the body and upwardly inclined at their forward end. The hinges 46 extend generally parallel to the chord of the body. The sides of channel 38 are formed by control surface members 42 and 44 together with stationary fins 50 and 52.

Figure 5:
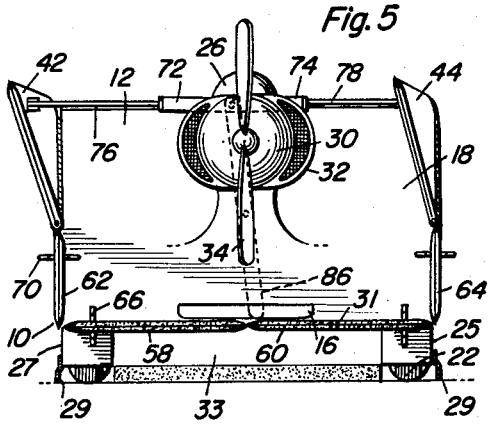
FIGURE 5 is a rear view of the vehicle in FIGURE 1 but showing the control surface members in a different position of adjustment.
Figure 6:
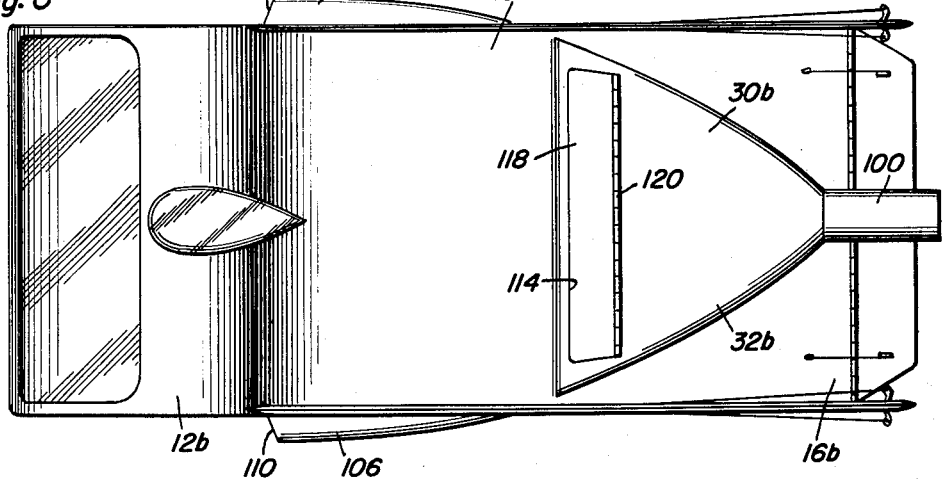
FIGURE 6 is a top view of a modification, differing essentially from that of FIGURE 1 by the substitution of a different type of engine.

Combination ailerons and elevators 56 and 58 are mounted on hinge 60 at the trailing edge of the body. Rudders 62 and 64 are at the trailing edges of the fins 52 and 50. The controls 66 for the combined elevators and ailerons 56 and 58 are standard, as are the controls 70 for the rudders 62 and 64. The controls can be cables that are attached to horns on the control surfaces and that are operatively connected with a control wheel, stick or the like in the cabin. The control assembly 72 for members 42 and 44 is considered unique. This assembly consists of a double acting cylinder 74 having piston rods 76 and 78 extending from each end and pivoted to the members 42 and 44 or to horns or brackets attached to these members. Three hydraulic lines 79, 80 and 81 are attached to the ends and center of the double acting cylinder so that either or both pistons can be retracted or extended from cylinder 74 and thereby operate the control surface members 42 and 44. During this operation cylinder 74 is held stationary by means of lever 86 pivoted to the cylinder and extending to a servo or mechanical control in the aircraft. When both control surfaces are moved in unison (see FIGURE 5) the entire assembly is moved by shifting the lever 86 from side to side and this operates both control surface members 42 and 44 for lateral control of the craft. Although control assembly 72 is illustrated on the exterior of the aircraft it is to be understood that this is shown this way merely for clarity and that the entire assembly is preferably mounted beneath engine 30 and within the confines of the body 12.

The bottom surface of the body, being substantially flat, generates a considerable ground effect to facilitate take-offs and landings. In addition this surface is excellent for water travel when the craft is used as an air boat.

Figure 8:
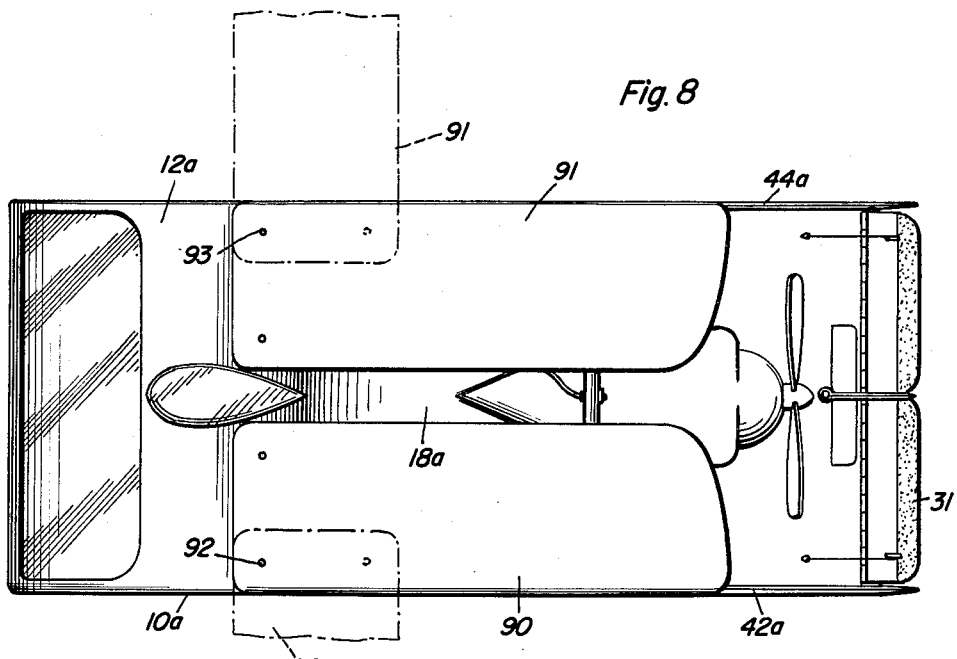
FIGURE 8 is a top view of another modification differing from that of FIGURES 1 and 6 in the inclusion of foldable wings.
Figure 9:
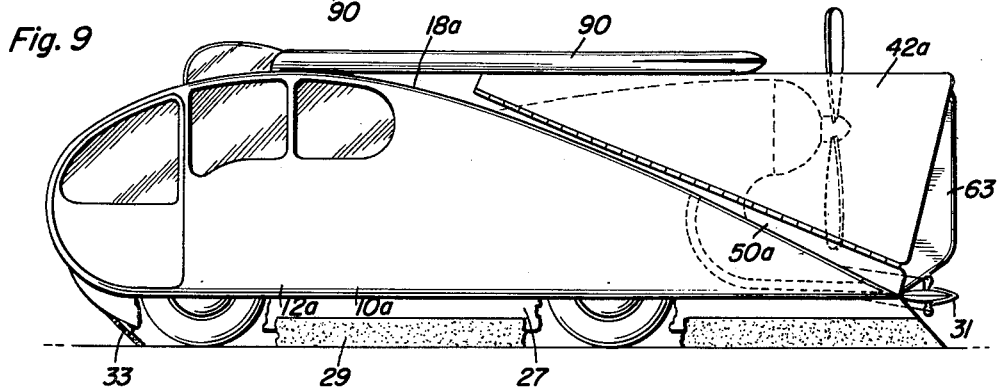
FIGURE 9 is a side view of the vehicle in FIGURE 8.
Figure 10:
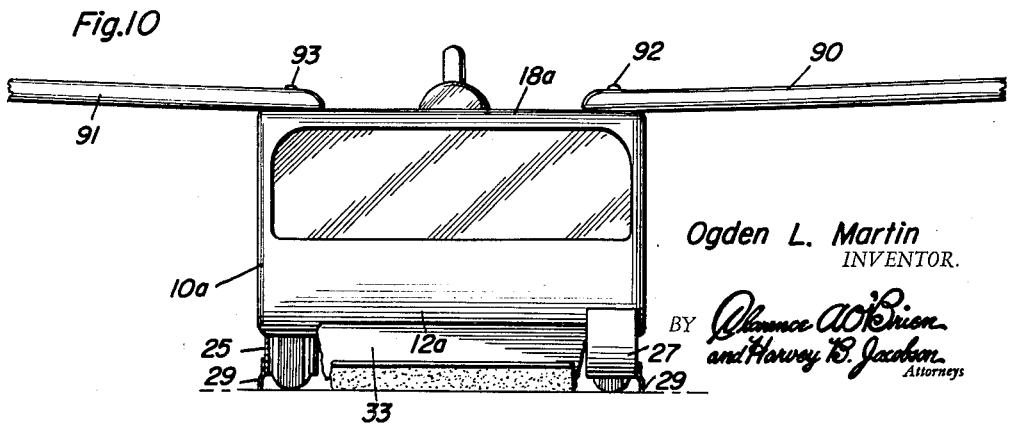
FIGURE 10 is a front view of the vehicle in FIGURE 8.

In FIGURES 8–10 there is a modification which has small differences of construction from the craft 10. Craft 10a has a body 12a of essentially the same shape as body 12. Stationary fins 50a are shorter enabling the roll control surface members 42a and 44a to be made with a larger area. The two rudders 62 and 64 are substituted by a single centrally located rudder 63.

Figure 7:
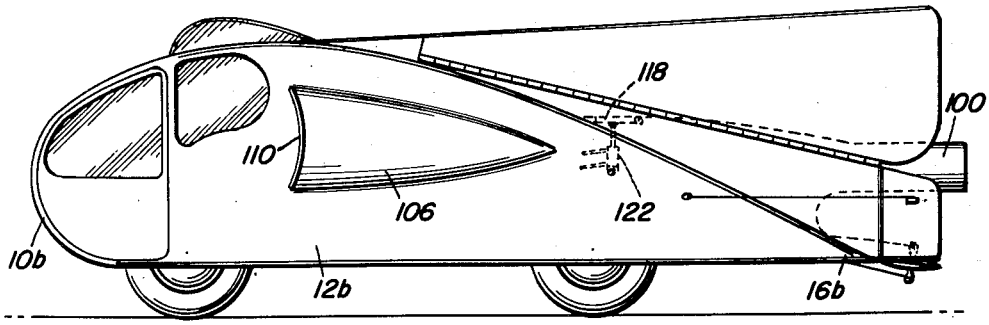
FIGURE 7 is a side view of the aircraft in FIGURE 6.

Foldable and/or detachable wings 90 and 91 are attached to the body 12a. These will provide additional lift when the craft is used as a heavier-than-air craft. When used in any other capacity the wings can be folded about pivots 92 and 93 and latched in a position over the top surface 18a of the body 12a. Alternatively the wings 90 and 91 can be detached. The variation which involves additional wings 90 and 91 and alterations in the empennage control surfaces, may be made not only with the propeller driven models but also with the jet motor operated craft 10b. The vehicle or craft 10b is constructed the same as the vehicle or craft 10 except the engine 30 is substituted by a jet engine or motor 30b. This is located in or on the body 12b with a tailduct 100 in the region of the trailing edge 16b of body 12b. The specific construction of the engine is standard. However, there are two air scoops 104 and 106 that have air inlets 108 and 110 on the side of the body 10b to accept ambient air under ram pressure for the jet engine. A dual functioning air inlet 114 is at the forward part of the engine housing 32b and is controlled by a shutter 118. Hinge 120 mounts the shutter so that it is capable of opening and closing air inlet 114. A hydraulic cylinder 122 (FIGURE 7) is shown mechanically attached to shutter 118 for opening and closing air inlet 114. As indicated, the inlet serves two purposes. The first is to receive air to support combustion in the jet motor. The second is to bleed boundary air layer from the top surface of the body 12b and thereby function as a high lift device.

The foregoing is considered as illustrative only of the principles of the invention. Further, since numerous modifications and changes will readily occur to those skilled in the art, it is not desired to limit the invention to the exact construction and operation shown and described and claimed, and accordingly, all suitable modifications and equivalents may be resorted to, falling within the scope of the invention as claimed.

What is claimed as new is as follows:

1. An amphibious and road traveling aircraft comprising a lift producing body that has a leading edge, a trailing edge, a curved upper surface and a comparatively straight lower surface, fore and aft extending roll control surface members extending upwardly at the sides of said body and cooperating with said curved upper surface to form a channel, means hingedly mounting said surface members on said body for movement about an axis extending fore and aft of said body and upwardly inclined at its forward end, means for selectively individually adjusting said members and adjusting said members in unison, and means including an engine for producing a propulsive airstream in said channel between said surface members and over the upper curved surface of said body.

2. An amphibious and road traveling aircraft comprising a lift producing body that has a leading edge, a trailing edge, an upwardly curved upper surface and a comparatively straight lower surface, fore and aft extending roll control surface members at the sides of said body, means hingedly mounting said surface members on said body for movement about an axis extending fore and aft of said body and upwardly inclined at its forward end, means for selectively individually adjusting said members and adjusting said members in unison, means including an engine for producing a propulsive airstream between said surface members and over the upper curved surface of said body so that said surface members and the upper surface of said body constitute an upwardly opening channel, means to conduct at least a part of the gas from the engine to the bottom of the body for discharge thereunder, and ski-like housings on said body extending longitudinally thereof between which said gas is discharged.

3. An amphibious and road traveling aircraft comprising a lift producing body that has a leading edge, a trailing edge, an upwardly curved upper surface and a comparatively straight lower surface, a wing attached to said body, fore and aft extending roll control surface members extending upwardly at the sides of said body, means hingedly mounting said surface members on said body for movement about an axis extending fore and aft of said body and upwardly inclined at its forward end, means for selectively individually adjusting said members and adjusting said members in unison, and means including an engine for producing a propulsive airstream between said surface members and over the upper curved surface of said body so that said surface members and the upper surface of said body constitute an upwardly opening channel whose cross-section is varied in response to adjustment of said roll control surfaces, and additional control surfaces adjustably secured to said body and located downstream of said roll control members.

4. An aircraft comprising a lift producing body that has a leading edge, a trailing edge, a curved upper surface and a comparatively straight lower surface, fore and aft extending roll control surface members extending upwardly at the sides of said body, means hingedly mounting said control surface members on said body for movement about an axis extending fore and aft of said body and upwardly inclined at its forward end, means for adjusting said members, and means including an engine for producing propulsive airstream between said control surface members and over the upper curved surface of said body, so that said control surface members and the upper surface of said body constitute an upwardly opening channel.

5. The aircraft of claim 4 wherein said engine is composed of a jet motor having an air inlet located in said channel downstream of the maximum thickness station of the body to increase the lift of said body.

6. The aircraft of claim 4 wherein said engine is composed of a jet motor having an air inlet located in said channel downstream of the maximum thickness station of the body to increase the lift of said body, an additional air inlet communicating with said jet motor and opening on the exterior of said channel to receive ambient air under ram pressure for said motor.

7. The aircraft of claim 4 wherein said engine is composed of a jet motor having an air inlet located in said channel downstream of the maximum thickness station of the body to increase the lift of said body, an additional air inlet communicating with said jet motor and opening on the exterior of said channel to receive ambient air under ram pressure for said motor, and an adjustably mounted control shutter for said inlet in said channel.

8. The aircraft of claim 4 wherein said engine is composed of a jet motor having an air inlet located in said channel downstream of the maximum thickness station of the body to increase the lift of said body, and an adjustable shutter controlling the quantity of air induced through said inlet and thereby regulating the quantity of air bled from the airstream in said channel.

9. The aircraft of claim 4 wherein said engine has a propeller located at least in part within said channel.

10. In a craft capable of travel on land, in water and through the air, the combination of a body that has a front and a rear edge and a cambered upper surface so that the body is capable of producing lift when propelled through the air, a pair of fins connected longitudinally on said body, a pair of longitudinally extending control surface members hinged to said fins for movement about an axis extending fore and aft of said body and upwardly inclined at its forward end, said fins spaced from each other and coacting with the cambered upper surface of said body to form an upwardly opening air conducting passage, thrust producing means carried by said body and producing an airstream through said passage by moving the body through the air, and means for hingedly actuating said control surface members.

11. In a craft capable of travel on land, in water and through the air, the combination of a body that has a front and a rear edge and a cambered upper surface so that the body is capable of producing lift when propelled through the air, a pair of fins connected with said body, a pair of control surface members hinged to said fins, said fins spaced from each other and coacting with the cambered upper surface of said body to form an air conducting passage, thrust producing means carried by said body and producing an air stream through said passage by moving the body through the air, means for hingedly actuating said control surface members, said control surface members actuating means including a double acting cylinder that has two piston rods extending from opposite ends and pivotally connected to actuate said control surface members, means for applying fluid under pressure to selected ends of said cylinder and to the center of the cylinder to selectively operate said pistons in unison or individually, and means for bodily moving said cylinder and its pistons to simultaneously actuate said control surface members in the same direction.

12. The aircraft of claim 11 wherein there is a transverse flap at the forward lower part of said body.

13. The aircraft of claim 11 wherein there are flexible strips along the lower outer edges of said body.

14. The combination of claim 1 wherein the axis of rotation of said roll control surface members extend generally parallel to the chord of said body.

References Cited in the file of this patent

UNITED STATES PATENTS

| | | |
|---|---|---|
| 1,693,773 | Anderson | Dec. 4, 1928 |
| 2,409,446 | Pavlecka et al. | Oct. 15, 1946 |
| 2,681,773 | Rethorst | June 22, 1954 |
| 2,707,084 | Mills | Apr. 26, 1955 |
| 2,713,465 | Novinger | July 19, 1955 |
| 2,729,405 | Doolittle | Jan. 3, 1956 |
| 2,811,323 | Rethorst | Oct. 29, 1957 |
| 2,893,661 | Aylor | July 7, 1959 |